United States Patent [19]

Roberto

[11] Patent Number: 4,832,172
[45] Date of Patent: May 23, 1989

[54] STORAGE AND DISCHARGE APPARATUS

[75] Inventor: Dale J. Roberto, Knox County, Tenn.

[73] Assignee: Smalley Manufacturing Co., Inc., Knoxville, Tenn.

[21] Appl. No.: 13,466

[22] Filed: Feb. 11, 1987

[51] Int. Cl.⁴ ............................................. B65G 47/46
[52] U.S. Cl. .................................... 198/364; 198/524; 198/534; 198/585; 198/535
[58] Field of Search ............... 198/364, 535, 585, 525, 198/524, 534; 414/272, 294, 295, 300

[56] References Cited

U.S. PATENT DOCUMENTS

| | | | |
|---|---|---|---|
| 2,599,659 | 6/1952 | Phillips et al. | 198/535 |
| 3,550,752 | 12/1970 | Gregor | 198/364 X |
| 3,822,794 | 7/1974 | Fougea | 414/272 X |
| 3,877,585 | 4/1975 | Burgess, Jr. | 198/585 X |
| 4,194,343 | 3/1980 | Myers et al. | 198/535 X |
| 4,501,350 | 2/1985 | Muller et al. | 198/535 X |

OTHER PUBLICATIONS

WO86/04315, PCT, Zagorzycki et al., 7/1986.

*Primary Examiner*—Robert J. Spar
*Assistant Examiner*—D. Glenn Dayoan
*Attorney, Agent, or Firm*—Pitts and Brittian

[57] ABSTRACT

An improved storage and discharge apparatus (10) for receiving items to be stored and selectively discharging same. The storage and discharge apparatus (10) comprises a depositary (14) for receiving items to be stored, the depository (14) defining a forward end portion (22) defining a discharge opening (26). The depository (14) further defines a bottom portion comprising a discharge conveyor (16) for supporting the items stored and for selectively discharging the items through the discharge opening (26). The apparatus also comprises a traveling loading mechanism (12) disposed above the depository (14) for depositing items to be stored into the depository (14). The loading mechanism (12) is longitudinally movable along substantially the length of the depository (14) and is selectively driven by a suitable drive. The loading mechanism (12) includes a cross-feed vibratory conveyor (50) having a vibratable tray (66) for receiving items to be stored, the tray (66) defining a slot (b 74) disposed above the depository through which the items are received. A movable wall (76) is disposed beneath the tray (66) rearward of the and adjacent to the slot (b 74), the movable wall (76) extending downwardly from the cross-feed conveyor (50) into the depository and being inclined toward the forward end portion (22) of the depository (14). In the preferred embodiment, the apparatus (10) is provided with an electrical control (94) for automatically controlling the loading and unloading of the depository (14).

11 Claims, 4 Drawing Sheets

STORAGE AND DISCHARGE APPARATUS

TECHNICAL FIELD

This invention relates to an improved storage and discharge apparatus for storing items such as breakable food items and for selectively discharging such items from storage as desired. In this particular invention, the apparatus comprises a depository including a discharge conveyor and a loading mechanism movably disposed above the depository.

BACKGROUND ART

Storage bins and depositories for storing various items are common in the prior art and many provide mechanisms for automatically loading items into the depository. However, such loading is normally accomplished by mounting a loading device above the depository and dropping the items into the depository. Whereas this procedure is adequate for loading non-breakable items, it is totally inappropriate where breakable items such as, for example, potato chips or cookies are being loaded. Allowing breakable items to free fall from the loading device results in unacceptable breakage and monetary loss. Further, it is often desirable to remove items from the depository in the same order that they are deposited. This is particularly true where perishable food items are being stored and first-in, first-out loading and unloading of the depository is necessary to avoid spoilage. In this regard, efficient loading and discharge systems for accomplishing first-in, first-out, loading and discharge are lacking in the art.

Therefore, it is an object of the present invention to provide an improved storage and discharge apparatus for receiving items to be stored and selectively discharging such items as desired.

Another object of the present invention is to provide an improved storage and discharge apparatus comprising a loading mechanism which reduces breakage of items to be stored during the loading process.

A further object of the present invention is to provide an improved storage and discharge apparatus which provides for first-in, first-out loading and unloading.

Still another object of the present invention is to provide an improved storage and discharge apparatus which is inexpensive to manufacture and maintain.

DISCLOSURE OF THE INVENTION

Other objects and advantages will be accomplished by the present invention which provides an improved storage and discharge apparatus for storing items such as potato chips, cookies, or other items and for selectively discharge such items. The improved storage and discharging apparatus comprises a depository for receiving the items to be stored, the depository, in turn, comprising a first end portion defining a discharge opening, and a second end portion. The depository is provided with a bottom portion which comprises a discharge conveyor for supporting the items stored in the depository and for selectively moving the stored items toward and through the discharge opening to facilitate the discharge of items from the depository. The storage and discharge apparatus also includes a loading mechanism disposed above the depository for depositing items to be stored in the depository. The loading mechanism is longitudinally movable between a first position proximate the forward end portion of the depository and a second position proximate the rearward end portion of the depository, and a first drive means is provided to accomplish the longitudinal travel of the loading mechanism. The loading mechanism includes a cross-feed vibratory conveyor including a selectively vibratory tray for receiving the items to be stored, the tray defining a slot disposed above the depository through which items to be stored are received. A movable wall is mounted beneath the tray rearward of and adjacent to the slot provided in the tray. The movable wall extends downwardly from the cross-feed conveyor into the depository and is inclined toward the forward end portion of the depository at a preselected angle such that as items fall through the slot provided in the tray of the cross feed conveyor, they are initially slidably received by the movable wall rather than allowed to free fall to the bottom of the depository. After the initial filling of the depository, items are deposited on the wall but only slide to about the top of the level of previously stored items.

BRIEF DESCRIPTION OF THE DRAWINGS

The above-mentioned features of the present invention will become more clearly understood from the following detailed description of the invention read together with the drawings in which.

BEST MODE FOR CARRYING OUT OF THE INVENTION

Figure 1:
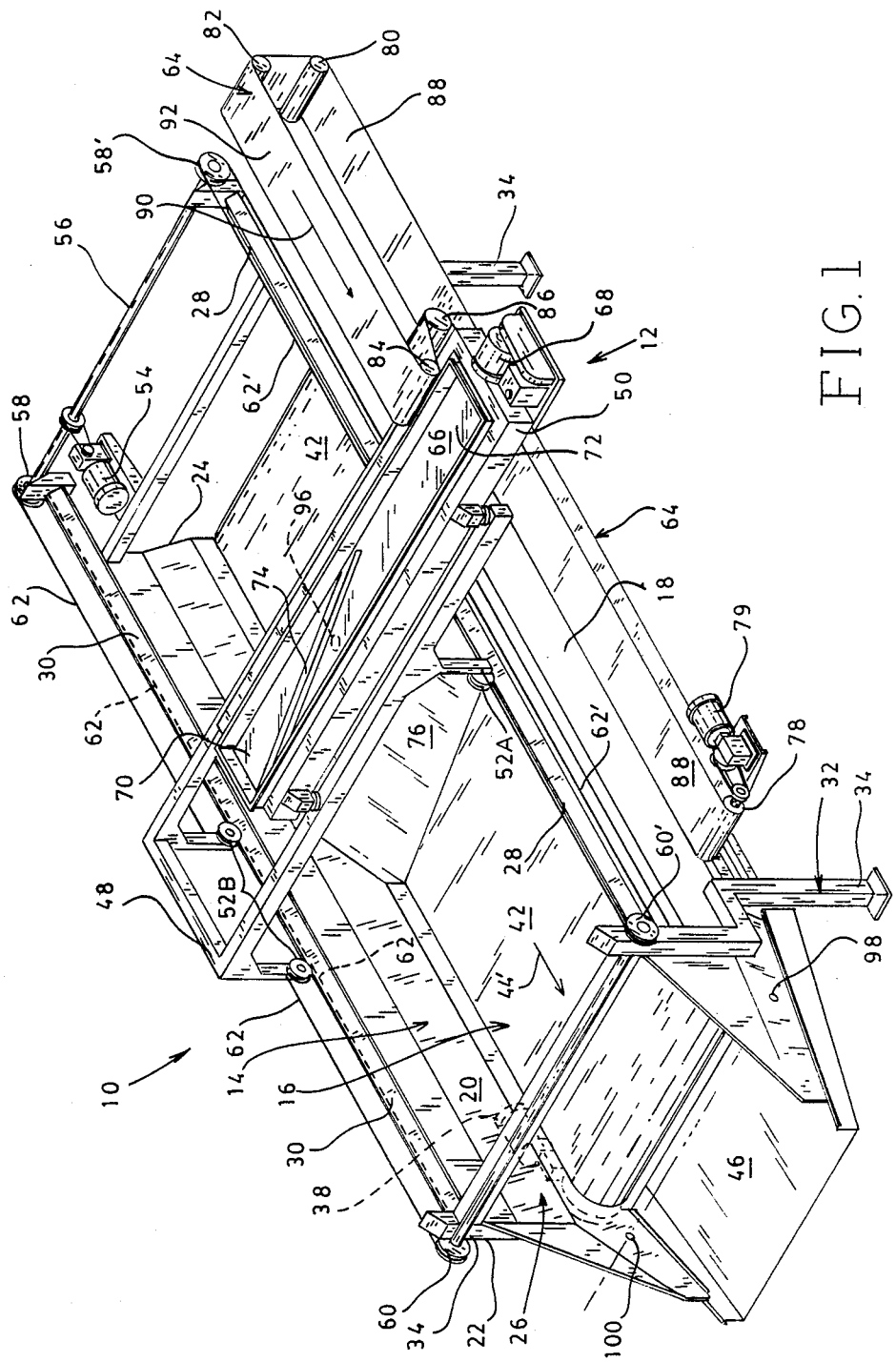
FIG. 1 illustrates a perspective view of the improved storage and discharge apparatus of the present invention.
Figure 2:
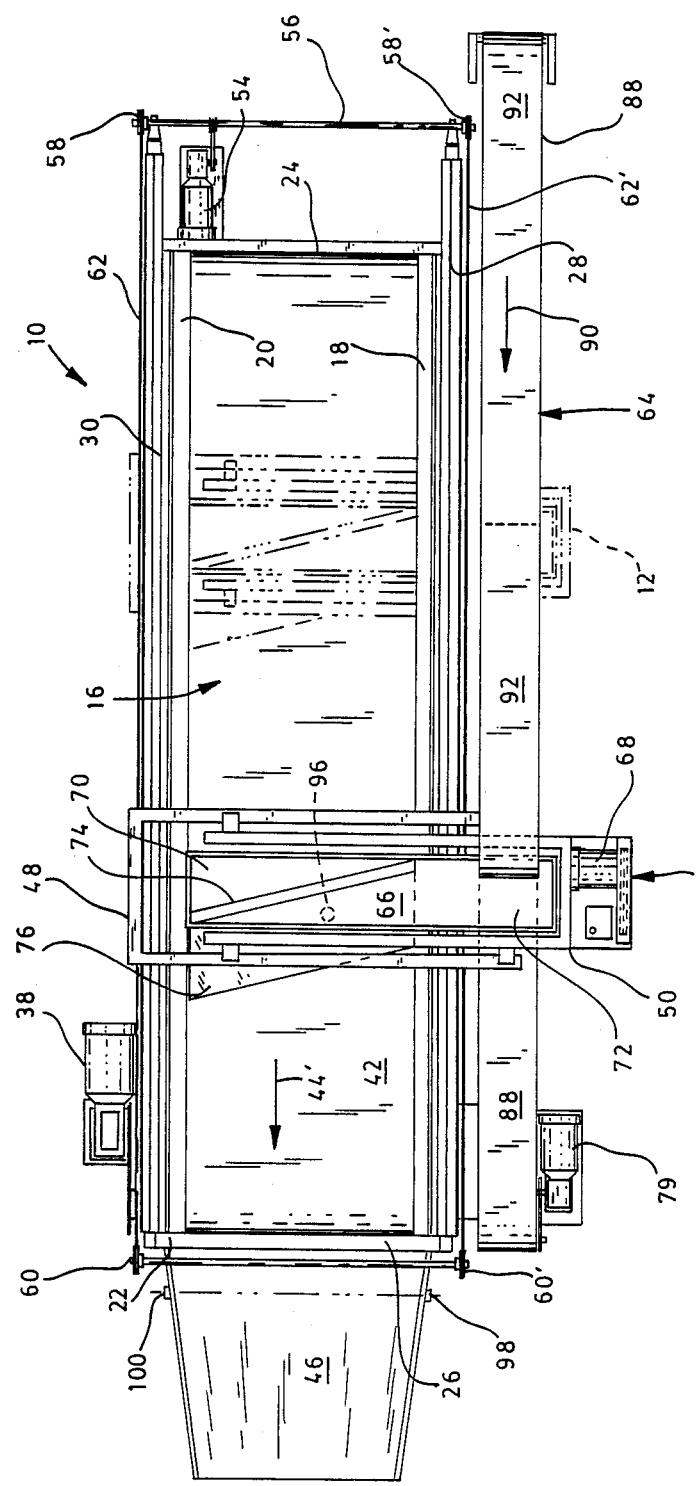
FIG. 2 illustrates a top view of the improved storage and discharge apparatus of the present invention.

An improved storage and discharge apparatus incorporating various features of the present invention is illustrated generally at 10 in the figures. The storage apparatus 10 is designed to be utilized for the storage of food items such as potato chips, cookies, or th elike which are highly breakable, and comprises an improved loading mechanism 12 which reduces breakage of the food items during the loading process. It will be understood from the discussion which follows, however, that use of the storage apparatus 10 is not limited to the storage of breakable food items, and the apparatus 10 can be used to store various breakable or non-breakable items if desired.

Referring now to the figures, the storage apparatus 10 comprises a depository 14 for receiving the items to be stored, and, as indicated above, a loading mechanism 12 for loading items into the depository 14. The depository 14 includes a bottom portion which in the preferred embodiment comprises a discharge conveyor 16, and includes first and second opposite sidewalls 18 and 20, respectively. The depository 14 also comprises forward and rearward end portions 22 and 24, respectively, with the forward end portion 22 defining a discharge opening 26 out of which stored items can be discharged. Further, a pair of first and second oppositely disposed rail members 28 and 30 are disposed proximate the upper edges of the sidewalls 18 and 20, respectively, and extend substantially the length of the depository 14. It will be noted that in the preferred embodiment, the rail members 28 and 30 comprise a portion of a frame 32 which includes a plurality of leg members 34 on which the storage apparatus 10 is supported.

The discharge conveyor 16 provides a means for moving the items stored in the depository 14 through the discharge opening 26 and out of the depository 14. The discharge conveyor 16 comprises a head roller 36 (see FIG. 3) located proximate the first end portion 22 of the depositor 14 which is selectively rotated by the first drive motor 38, and a secondary roller 40 rotatably mounted proximate the second end portion 24 of the depository 14. A first conveyor belt 42 is received around the head roller 36 and the secondary roller 40 and extends across the depository 14 such that the conveyor belt 42 defines the surface on which the items stored are supported. Thus, in order to move items out of the depository 14, the motor 38 is used to selectively rotate the head roller 36 in the direction indicated by the arrow 44 (see FIG. 3) thereby moving the belt 42 in the direction indicated by the arrow 44'. In order to assist in the discharge of the items from the depository 14, the apparatus 10 can also be provided with a discharge chute which in the preferred embodiment comprises a vibratory conveyor 46 actuated by a suitable vibratory motor (not shown). Of course, it will be understood by those skilled in the art that the vibrating action of the vibratory conveyor continues the outward movement of the items being discharged from the depository 14 after such items leave the discharge conveyor belt 42.

As illustrated in the figures, the loading mechanism 12 comprises a traveling carriage 48 which laterally spans the depository 14 and on which is mounted a cross-feed conveyor 50. The carriage 48 is provided with a pair of wheel members 52A which rotatably engage the rail member 28 and a pair of wheel member 52B which rotatably engage the rail member 30. Resultantly, the carriage 48 can selectively travel substantially the length of the rail members 28 and 30. In this regard, the selective travel of the carriage 48 is accomplished by a suitable drive means. In the preferred embodiment such first drive means comprises a motor 54 which selectively rotates a drive shaft 56, the drive shaft 56 being rotatably supported by the rail members 28 and 30 proximate the rearward end portion 24 of the apparatus 10. A first pulley 58 is mounted on the shaft 56 proximate the rail member 30 so as to rotate with the shaft 56, and a second pulley 60 is mounted on the frame 32 proximate the forward end portion 22 of the apparatus. A drive cable 62 is received around the pulleys 58 and 60 and the opposite end portions of the cable 62 are secured to the carriage 48 as is best illustrated in FIG. 1. Thus, as the motor 54 selectively rotates the pulley 58, the resultant motion of the cable 62 causes the carriage 48 to travel along the rail members 28 and 30. Further, as illustrated by reference numerals 58', 60', and 62' in FIG. 1, a second pulley/cable arrangement mounted adjacent the rail 28 can also be driven by the shaft 56 to more efficiently drive the carriage 48.

Of course, the above-described means for driving the carriage 48 along the rail members 28 and 30 is simply illustrative of one suitable drive means. Further, it should be noted that the providing of the carriage 48 with the wheel members 52A and B is simply one preferred means of accomplishing the desired reciprocal travel of the carriage 48 and other suitable means can be utilized. For example, the carriage 48 can be slidably mounted on the frame 32 or on the upper edges of the sidewalls 18 and 20. Further, if desired, the carriage 48 can be movably supported above the depository 14 independent of the frame 32 and the depository 14.

The cross-feed conveyor 50 serves to receive the items to be stored from an infeed conveyor 64 and deposits the items in the depository 14. In the preferred embodiment, the cross-feed conveyor 50 is a vibratory conveyor comprising a selectively vibratable tray 66 for receiving and conveying the items to be stored, with the selective vibration of the tray 66 being accomplished by a suitable vibratory motor means 68. As illustrated, the conveyor 50 is oriented on the carriage 48 such that a portion 70 of the tray 66 laterally spans the depository 14 and an outboard portion 72 of the tray 66 extends outwardly beyond the sidewall 18 of the depository 14 to facilitate the receipt of the items to be stored from the infeed conveyor 64.

It will be understood by those skilled in the art that as the tray 66 is vibrated, the items to be stored migrate toward the portion 70 which spans the depository 14. In order to accomplish the depositing of the items to be stored in the depository 14, the tray 66 is provided with a slot 74, which in the preferred embodiment extends substantially the width of the depository 14 and is disposed at a bias angle to facilitate the even depositing of items into the depository 14. To obviate breakage of the items as they are dropped into the depository 14, a movable wall 76 extends downwardly into and across the depository 14 from the first sidewall 18 to the second sidewall 20 and is inclined toward the forward end portion 22 of the storage apparatus 10 at a preselected angle. During initial filling of the depository as items to be stored fall through the slot 74, they are received on the movable wall 76 and slide to the bottom of the depository 14. Thereafter, items move along the movable wall only to the level of the items previously deposited. Thus, the movable wall 76 obviates breakage of items which would otherwise occurs from the free fall of items from the slot 74 to the bottom of the depository. Primarily, the movable wall serves as a movable rear wall for the depository whereby the level of deposited items remains substantially constant during discharge or loading operations.

Figure 3:
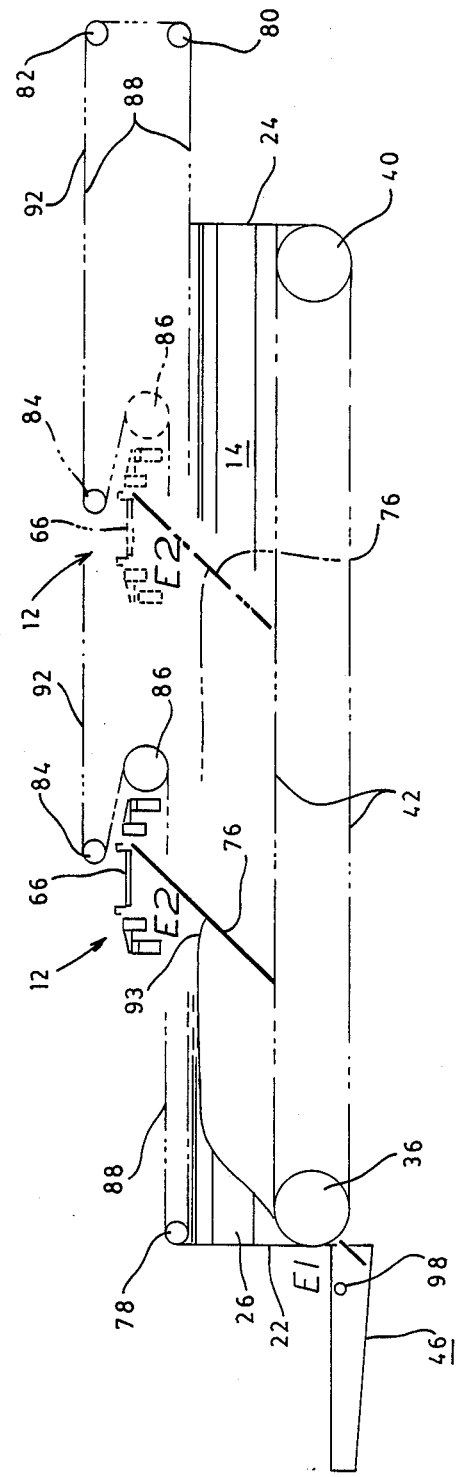
FIG. 3 illustrates a diagrammatic side elevation view of the improved storage and discharge apparatus of the present invention.

As mentioned above, the infeed conveyor 64 serves to deposit items to be stored on the cross-feed conveyor 50 such that the items can be deposited in the depository 14. In the preferred illustrated embodiment, the infeed conveyor 64 comprises a head roller 78 mounted on the frame 34 proximate the first end portion 22 of the depository, the head roller 78 being selectively rotated by a suitable motor 79, and a pair of secondary rollers 80 and 82 rotatably mounted on a suitable support means proximate the second end portion 24 of the depository 14. In order to accommodate the reciprocal travel of the operatively associated carriage 48, a pair of further rollers 84 and 86 are rotatably mounted on the carriage 48. An infeed conveyor belt 88 is received around the rollers 78, 80, 82, 84 and 86 as best illustrated in FIGS. 1 and 3 such that travel of the belt 88 is accomplished by the selective rotation of the head roller 78. It will be noted that the rollers 82 and 84 are disposed above the level of the tray 66 with the further roller 84 positioned over the outboard portion 72 of the tray 66 such that as the belt 88 is moved in the direction indicated by the arrow 90, items deposited on the upper level 92 of the belt 88, between the rollers 82 and 84, are carried to and deposited in the tray 66. Of course, it will be appreciated that the mounting of the further rollers 84 and 86 on the carriage 48 maintains the conveyor belt 88 in position over the outboard end portion 72 of the tray 66 without the interfering with the travel of the belt 88 about the supporting rollers, thus allowing contemporaneous travel of the belt 88 and the carriage 48.

Referring now to the diagrammatic illustration of FIG. 3 and the operation of the storage apparatus 10, when the apparatus 10 is to be filled, the loading mechanism 12 is placed in a forward position proximate the forward end portion 22 of the depository 14. (It should be noted that the position of the loading mechansim 12 illustrated in FIG. 3 reflects the position of the mechanism after some loading to full level 93 has occurred and does not illustrate the full forward position.) The items to be stored are deposited on the upper level 92 of the infeed conveyor 64 whereupon the infeed conveyor 64 carries the items to the loading mechanism 12 and deposits the items in the tray 66 of the cross-feed conveyor 50. Selected vibration of the tray 66 causes the items to travel laterally to and through the slot 74 such that the items are deposited in the depository 14. When the stored items build up in front of the movable wall 76 to a preselected level, i.e., level 93, the loading mechanism 12 is moved rearwardly a preselected distance, and the loading process is continued until the stored items once again reach the preselected maximum level. Thus the loading mechanism 12 retreats in stages filling the depository from front to rear.

Of course, as discussed above, the discharge conveyor 16 is utilized to move the stored items out of the depository 14, with the vibratory conveyor 46 assisting in the unloading process. In this regard, it will be recognized that when the discharge conveyor 16 is activated, the stored items located at the front portion of the depository are discharged from the storage apparatus 10 first. Thus, because the loading mechanism 12 loads the depository 14 from front to back, a first-in, first-out, loading and unloading sequence is achieved. It will be appreciated that this first-in, first-out loading and unloading capability is particularly desirable where the items stored are perishable food items.

Whereas the above-described operation of the storage apparatus 10 can be accomplished through the manual actuation of the various motors and conveyors of the apparatus 10, in the preferred embodiment the storage apparatus 10 includes electrical control means generally indicated at 94 for automatically controlling the loading and unloading of the apparatus 10. The control means 94 serves in part to control the rearward and forward travel of the loading mechanism 12. For the purposes of the discussion which follows, the control means 94 will first be discussed in terms of functioning in the reverse mode, to accommodate rearward travel of the mechanism 12 during loading of the apparatus 10, and the forward mode to accommodate forward travel of the mechanism 12 during the unloading of the storage apparatus 10.

To facilitate the selective travel of the loading mechanism 12 in both the reverse and forward modes, the control means 94 comprises a first level detection means mounted on the loading mechanism 12. In the preferred embodiment such level detection means comprises a converging beam eye 96, such as the Jim Mink Sidewinder Type Banner converging beam eye, mounted under the cross-feed conveyor 50. When the level of the stored items in front of the movable wall 76 reaches or exceeds a preselected maximum level, the eye 96 is blocked, and depending upon the mode of operation, either rearward travel of the loading mechanism 12 is initiated or forward travel is terminated. In this regard, in the reverse mode, during the loading process, rearward travel of the loading mechanism is initiated when the stored items build up to the preselected maximum level so as to block the eye 96. Of course, as the movable wall 76 retreats from the pile of stored items previously deposited, the level of stored items adjacent the movable wall 76 falls below the preselected maximum and the eye 96, being no longer blocked, terminates the rearward travel of the loading mechanism 12, and the mechanism 12 once again fills the portion of the depository forward the movable wall 76 to the preselected maximum level. Thus, in the reverse mode, the loading mechanism 21 automatically fills the depository 14 to the preselected maximum level from front to back.

The forward mode of the control means 94 is operatively associated with the unloading of the depository 14 and is initiated in response to the activation of the discharge conveyor 16. In this regard, when the discharge conveyor 16 is activated in order to move items out of the depository, the control means 94 intiates forward movement of the loading mechanism 12, preferably at substantially the same speed as the belt 42 such that the movable wall 76 moves forward as the loading process continues. However, the control means 94 provides for such forward movement of the mechanism 12 only when the eye 96 is unblocked. When the eye 96 is blocked by items in front of the movable wall 76 exceeding the preselected maximum level, the control means 94 terminates the forward travel of the mechanism 12 until the eye 96 is once again unblocked. Thus, during the unloading process, the preselected maximum level of stored items is maintained in front of the movable wall 76, and, when the unloading process is terminated, the portion of the depository 14 to the rear of the movable wall 76 is available for storage by moving the wall in a rearward direction. Of course, this unloading process effectuated by the control means 44 insures that the earlier stored items are maintained toward the forward portion of the depository facilitating the first-in, first-out loading and unloading capability of the storage apparatus 10.

In the preferred embodiment, the control means 94 further comprises a second level detection means, such as the eye 98 and associated receptor 100, for sensing an excessive build up of items on the vibratory conveyor 46 and selectively terminating operation of the discharge conveyor 16 in response thereto. As illustrated in FIG. 1, the eye 98 directs a beam of light (represented by a broken line) across the conveyor 46 at a preselected level to strike the receptor 100. When items being discharged from the depository 14 build up to or above the preselected level such that the eye 98 is blocked, the control means 94 terminates the movement of the conveyor 16, and, thus, the forward movement of the loading mechanism 12, to allow the vibratory conveyor 46 to reduce the build up of items being discharged. When the build up has been reduced and the eye 98 is no longer blocked, the control means 94 activates the discharge conveyor 18 once again.

Figure 4:
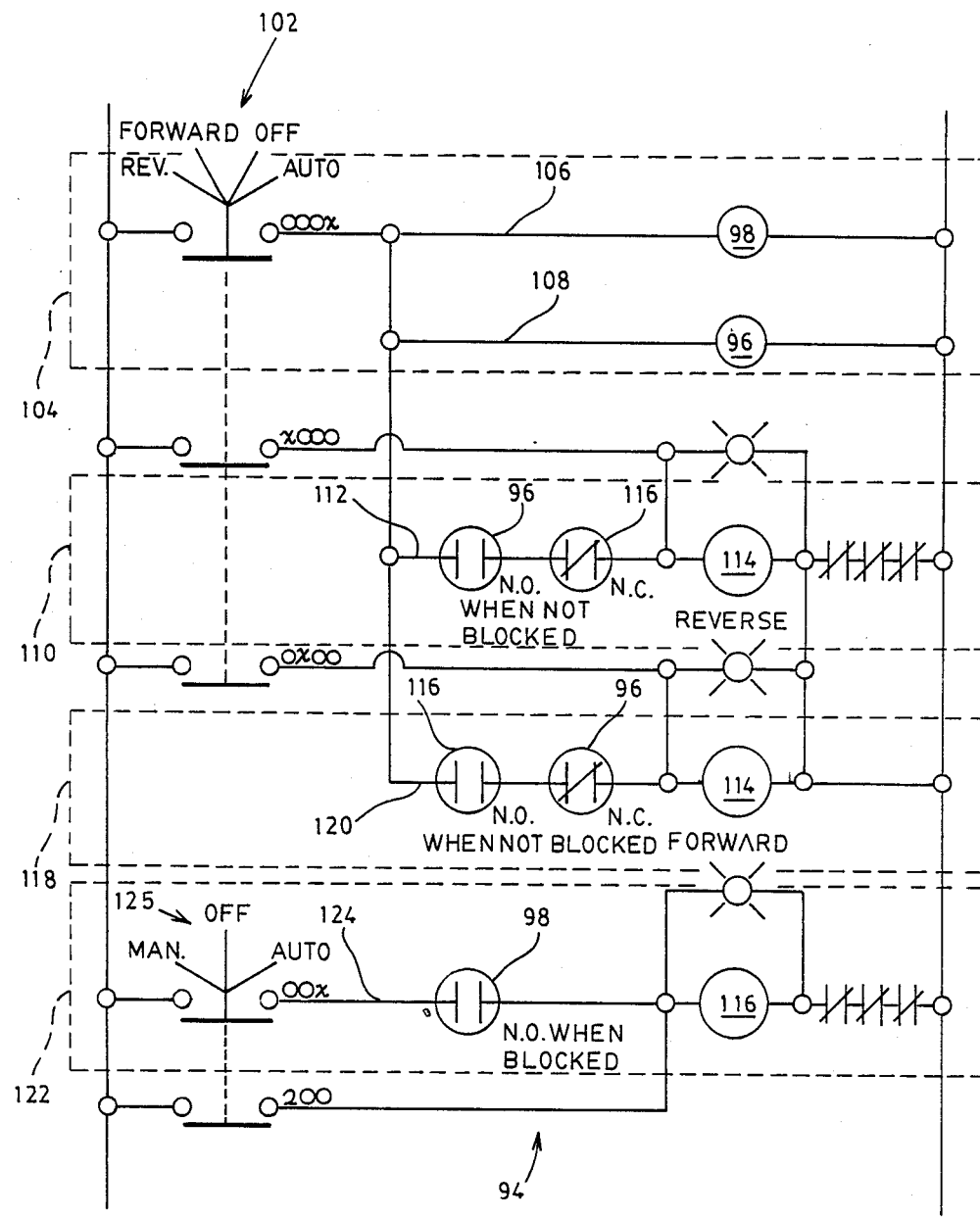
FIG. 4 is a conventional ladder diagram depicting the various modes of operation of the electrical control means of the improved storage and discharge apparatus of the present invention.

In FIG. 4, a ladder diagram depicting a suitable electrical control means 94 is diagrammatically illustrated so as to reflect the various modes of operation. This control means is depicted in a conventional ladder diagram in FIG. 4 which illustrates the various modes of operation and which can be given to a skilled electrician for wiring the apparatus. As illustrated, the control means 94 includes a first selector switch 102 which controls the travel of the loading mechanism 12. Preferably the switch 102 provides for an "off" position, manual operating positions to move the mechanism 12 forward and in reverse, and an automatic position for initiating the automatic reverse and forward modes. At 104 of the ladder diagram, lines 106 and 108 depict the power being supplied to the level detecting eyes 98 and 96' respectively, and at 110 of FIG. 4, the circuitry controlling the travel of the mechanism 12 is diagrammatically illustrated in the reverse mode. As depicted at line 112, the eye 96 opens the circuit when not blocked and thus no power is supplied to the first motor controller 114 which serves to actuate the motor 54 to precipitate rearward travel of the mechanism 12. However, when blocked, the eye 96 closed the circuit and power is supplied to the controller 114 initiating rearward travel. It will be noted that the second motor controller 116, which controls the discharge conveyor 16, is depicted as being normally closed during the reverse mode indicating that the conveyor 16 is not activated.

The forward mode of the control means 94 is illustrated at 118 of the ladder diagram of FIG. 4. As illustrated at line 120 when the eye 96 is not blocked the circuit is closed such that the motor control 114 activates the motor 54 to precipitate forward travel of the mechanism 12, with the motor control 116 reflecting the activated status of the discharge conveyor 16. At 122 of the ladder diagram, the circuitry controlling the discharge conveyor 16 is depicted, including a second selected switch 125 which allows the conveyor 16 to be manually actuated or set on automatic to be actuated in response to the blocked or unblocked status of the level detecting eye 98. As illustrated at line 124, when blocked the eye 98 opens the circuit shutting off power to the motor controller 116 and terminating operation of the conveyor 16. Of course, as indicated above and as depicted at 110 when the eye 98 is not blocked and the conveyor 16 is activated, the controller 114 causes forward travel of the mechanism 12 as long as the eye 96 is not blocked.

In light of the above, it will be appreciated that the present invention provides a storage apparatus 10 which provides for first-in, first-out storage and discharge, and features automatic control means for loading and unloading the storage apparatus 10. Further, the loading mechanism obviates undue breakage of breakable items by limiting the free fall of items to be stored to only the top of the depository 14. Instead, the items are deposited on the wall 76 and slide to near the top level of the stored items within the depository 14.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. An improved storage and discharge apparatus for receiving items to be stored and selectively discharging same, said apparatus providing for reduced damage to said items and first-in, first-out handling, said apparatus comprising:

a depository for receiving said items to be stored, said depository having first and second opposite sidewalls and forward and rearward end portions, said forward end portion defining a discharge opening through which said items to be stored are selectively discharged from the depository, said depository being provided with a bottom portion defining a discharge conveyor for supporting said items to be stored and selectively moving said items toward and through said discharge opening to facilitate discharge of said items from said depository;

a loading mechanism disposed above said depository for depositing said items to be stored in said depository, said loading mechanism being longitudinally movable between a first position proximate said forward end portion of said depository and a second position proximate said rearward end portion of said depository, said loading mechanism being provided with a first drive means for selectively effecting travel of said loading mechanism between said first position and said second position, said loading mechanism having a cross-feed vibratory conveyor including a selectively vibratable tray for receiving said items to be stored, said tray defining a slot oriented above said depository through which said items to be stored are received; and a movable wall attached to and disposed beneath said tray, rearward of and adjacent to said slot of said tray, said movable wall extending across said depository and continuously downwardly from said cross-feed conveyor into said depository to proximate said discharge conveyor during said receiving and discharging of said items and being inclined toward said forward end portion of said depository at a preselected angle, said movable wall providing a rearward support to all items stored in said depository to maintain a substantially uniform maximum level of said stored items and move toward said discharge opening as said stored items move out through said discharge opening, whereby selected vibration of said vibratory tray conveys said items to be stored to and through said slot to be deposited in said depository on said movable wall at substantially said maximum level of said stored items to reduce distance of free fall of said items from said slot and thereby reduce damage to said items.

2. The improved storage and discharge apparatus of claim 1 wherein said apparatus further comprises an infeed conveyor for converging said items to be stored to, and depositing said items on, said vibratable tray of said cross-feed conveyor.

3. The improved storage and discharge apparatus of claim 1 wherein said vibratable tray of said cross-feed conveyor defines a first portion which substantially spans said depository from said first sidewall to said second sidewall and said slot of said tray extends substantially the width of said depository from said first sidewall to said second sidewall and is disposed at a preselected bias angle to facilitate the even depositing of said items into said depository.

4. The improved storage and discharge apparatus of claim 2 wherein said vibratable tray defines a second portion which extends beyond said first sidewall of said depository for receiving said items to be stored from said infeed conveyor.

5. The improved storage and discharge apparatus of claim 1 wherein each said first and second sidewall of said depository defines an upper edge, and said depository is provided with a frame for supporting said depository, said frame including a first rail member disposed substantially parallel and adjacent to said upper edge of said first sidewall and a second rail member disposed substantially parallel and adjacent to said upper edge of said second sidewall, and wherein said loading mechanism comprises a carriage for movably carrying said cross-feed conveyor, said carriage having a pair of first wheel members for rotatably engaging said first rail member, and a pair of second wheel members for rotatably engaging said second rail member.

6. The improved storage and discharge apparatus of claim 1 wherein said apparatus further includes a discharge chute mounted on said forward end portion of said depository for receiving said items from said discharge conveyor to facilitate said discharge of said items from said depository.

7. The improved storage and discharge apparatus of claim 6 wherein said discharge chute comprises a second vibratory conveyor for conveying said items away from said discharge opening of said depository.

8. The improved storage and discharge apparatus of claim 1 wherein said apparatus further comprises electrical control means for automatically controlling the travel of said loading mechanism and the operation of said discharge conveyor.

9. The improved storage and discharge apparatus of claim 8 wherein said movable wall defines a forward surface and wherein said electrical control means comprises a first level detection means mounted on said loading mechanism for detecting when said items to be stored build up adjacent said forward surface of said movable wall to a preselected maximum level, said control means having a rearward control mode for actuating said first drive means and initiating travel of said loading mechanism and said movable wall toward said rearward end portion of said depository in response to said first level detection means detecting said items to be stored reaching said preselected maximum level, and for terminating said travel toward said rearward end portion when said first level detection means detects a level below said preselected maximum level.

10. The improved storage and discharge apparatus of claim 7 wherein said control means has a forward control mode, operatively associated with the activation of said discharge conveyor, for actuating said first drive means and initiating travel of said loading mechanism and said movable wall toward said forward end portion of said depository in response to said first level detection means failing to detect a build up of said items adjacent said forward surface to said preselected maximum level and for terminating said travel toward said forward end portion in response to said first level detection means detecting a build up of said items adjacent said forward surface of said movable wall to said preselected maximum level.

11. An improved storage and discharge apparatus for receiving items to be stored and selectively discharging same, said apparatus providing for reduced damage to said items and first-in, first-out handling, said apparatus comprising:

a depository for receiving said items to be stored, said depository having first and second opposite sidewalls each defining upper edges, and having forward and rearward end portions, said forward end portion defining a discharge opening through which said items to be stored are selectively discharged from said depository, said depository being provided with a bottom portion defining a discharge conveyor for supporting said items to be stored and selectively moving said items toward and through said discharge opening to facilitate discharge of said items from said depository;

a loading mechanism disposed above said depository for depositing said item to be stored in said depository, said loading mechanism being longitudinally movable between a first position proximate said forward end portion of said depository and a second position proximate said rearward end portion of said said loading mechanism being provided with a first drive means for selectively effecting travel of said loading mechanism between said first position and said second position, said loading mechanism having a cross-feed vibratory conveyor including a selectively vibratable tray for receiving said items to be stored, said tray defining a slot oriented above said depository through which said items to be stored are received;

a movable wall attached to and disposed beneath said tray, said movable wall extending across said depository and continuously downwardly from said cross-feed conveyor into said depository to proximate and discharge conveyor during said receiving and discharging of said items and being inclined toward said forward end portion of said depository at a preselected angle, said movable wall defining a front surface to form a rear wall of said depository and support all said deposited items to proximate a maximum preselected top level at said front surface whereby selected vibration of said vibratory tray conveys said items to be stored to and through said slot to be deposited in said depository on said movable wall at substantially said maximum top level of said stored items to reduce distance of free fall of said items and thereby reduce damage to said items; and electrical control means for automatically controlling the travel of said loading mechanism and the operation of said discharge conveyor, said control means including a first level detection means mounted on said loading mechanism for detecting when said items to be stored build up adjacent said forward surface of said movable wall to said preselected maximum top level, said control means having a reverse control mode for actuating said first drive means and initiating travel of said loading mechanism and said movable wall toward said rearward end portion response to said first level detection means detecting said items to be stored reaching said preselected maximum level and for terminating said travel toward said rearward end portion when said first level detection means detects said items falling below said preselected maximum level, said control means having a forward control mode, operatively associated with the activation of said discharge conveyor, for actuating said first drive means and initiating travel of said loading mechanism and said movable wall toward said forward end portion in response to said first level detection means failing to detect a build up of said items adjacent said foward surface of said movalbe wall to said preselected maximum level, and for terminating said travel toward said forward end portion in response to said first level detection means detecting a build up of said items adjacent said forward surface of said movable wall to said preselected maximum level.

* * * * *